Aug. 15, 1967           W. H. TYGART           3,336,529

VIBRATING REED FREQUENCY RESPONSIVE DEVICE

Filed Dec. 3, 1962           5 Sheets-Sheet 5

*INVENTOR.*
WILLIAM H. TYGART
BY
          Agent _United States Patent Office_

3,336,529
Patented Aug. 15, 1967

3,336,529
VIBRATING REED FREQUENCY RESPONSIVE DEVICE
William H. Tygart, Marietta, Ga., assignor to Lockheed Aircraft Corporation, Burbank, Calif.
Filed Dec. 3, 1962, Ser. No. 241,979
10 Claims. (Cl. 324—70)

This invention relates to a frequency responsive device, and more particularly to a frequency responsive device for producing a variable amplitude, polarity changing D.C. voltage signal in response to a sensed frequency change which employs mechanically resonant reeds.

In recent years a malfunction detection device to monitor the various components of aircraft to assure their proper functioning with the principal object being to detect malfunctions in their inception has been derived. In this way, corrective measures may be taken before problems reach such critical proportions that continued operation of the aircraft might result in total aircraft failure. One critical componetn of certain aircraft is the constant-speed aircraft-engine-powered propeller. The problem of monitoring constant speed propellers is solved in a unique manner by this invention by providing the propeller with a tachometer generator, the output signal frequency of which varies as a function of the sensed speed of the propeller, and apparatus responsive to this signal frequency for initiating a voltage signal, the amplitude and polarity of which varies as a function of the signal frequency. This voltage signal is then depicted and stored on the tape of a recording oscillograph by conventional methods for later analysis.

Although the frequency responsive device of this invention is particularly adapted to monitor propeller speed conditions, it is to be understood that it is as readily adaptable for use in the monitoring of any electrical or mechanical device, the basic operative mode of which is repetitive and is or may be accurately transduced into a variable frequency electrical signal. For example, the frequency responsive device of this invention is readily adapted to monitor an audio oscillator, the speed of rotation of any shaft, the continuity of movement of a conveyor belt, the pressure of fluid in a pipe or the like, when associated with the proper transducer. Furthermore, it is to be understood that the frequency responsive device is not limited to use as a monitor but that the output voltage signal produced thereby may as easily be used as a command or control signal for electrically operated equipment. For example, rather than monitoring the propeller speed as stated above, the output voltage signal of the frequency responsive device could as readily be used to operate an electrically actuated regulator valve supplying fuel to the powerplant driving the propeller to thereby regulate the speed of the propeller, or could be used to control other and different types of propeller speed governors.

In the frequency responsive device of this invention, there are provided reed assemblies which are mechanically resonant to frequencies equally disposed on either side of an input base or reference signal frequency and a device for transducing the vibrations of the reeds into electrical signals representative of the input signal frequency. More specifically, there is provided apparatus for separately vibrating two reeds in response to an incoming signal frequency, apparatus for transducing the vibration of each of the reeds into separate A.C. voltage signals, the amplitudes of which vary in direct proportion to the vibration of the incoming signal frequency, and apparatus for summing and combining these separate electrical signals into a polarity changing D.C. output voltage signal which is accurately reflective or representative of the incoming signal frequency.

That portion of the frequency responsive device of this invention wherein changes in the output signal frequency are detected, which portion may properly be called a frequency discriminator, is susceptible of various constructions. One construction developed utilizes coils for inducing the vibration of weighted reeds and coils responsive to the vibration of the reeds to produce separate electrical signals which are summed and combined into the single D.C. output voltage signal. This frequency transducer has the advantage of being made up of commercially available parts, it has excellent operational characteristics, it is of good solid construction, and is easily manufactured. Possible limitations of this type frequency discriminator are that it is somewhat heavy in that it uses coils, and it is not capable of miniaturization in that its size is dictated by the size of the coils. Although these limitations do not detract from the operation of the frequency discriminator and pose no problem to its use in ground installations, they frequently restrict the use of the coil type frequency discriminator in the aerospace industry where weight and space limitations are so critical. In view of these considerations, a miniaturized frequency discriminator was developed comprising a set of piezo-electric crystals mounted on each of the reeds to form driving bi-morphic crystal assemblies for causing the reeds to vibrate in accordance with the input signal frequency, and/or a set of piezoelectric crystals mounted on each reed to form driven or sensing bi-morphic crystal assemblies which in response to the vibrations of the reeds are operative to produce separate A.C. voltage signals which are converted and combined into the single D.C. output voltage signal. Tests have disclosed that the frequency discriminator embodying bi-morphic crystal-driven reeds has excellent sensitivity and reliability. Further, the miniaturized frequency discriminator is small and lightweight by reason of eliminating the requirement for massive components such as coils.

In the development of the miniaturized frequency discriminator, it was found that by folding the free ends of the reeds in accordion-fashion, that a further space-saving could be effected without detrimentally affecting the operating characteristics of the frequency discriminator. The space-saving qualities of folded reeds may be brought into proper perspective by comparing the length of a standard reed which is in the order of 8-inches with that of a folded reed having approximately the same frequency characteristics which may be in the order of 2-inches. A further advantage of the folded-reed principle is that it may be applied to any vibrating reed without regard to its driving device and its vibration sensing device. Benefits in addition to miniaturization are realized from this construction in that the folding of a reed with different angles between its folds permits adjustment of the frequency of the reed within reasonable limitations.

It was also found that further miniaturization, over non-folded reeds, could be effected by cantilever mounting the bi-morphic crystal-driving and sensing assemblies separate from the reed and by cantilever mounting the tuned vibrating reed in spaced-apart relation from the bi-morphic crystal assembly but connected to the end of the bi-morphic crystal assembly such that upon vibration of the crystal assembly the tuned reed would also vibrate. Benefits in addition to miniaturization are realized from this construction in that it permits the changing of reeds to cover widely different frequency ranges without ruining the driving and/or driven crystals, makes possible mass production of bi-morphic crystal assembly units of a standard type, and provides isolation of the reed from the effects of temperature variation on the bi-morphic crystal assembly.

It will be appreciated therefore that it is an object of this invention to provide a frequency responsive device which is operative to initiate a D.C. output voltage signal, the amplitude and polarity of which changes as a function of a sensed signal frequency change.

It is another object of this invention to provide a frequency responsive device which is operative to monitor the operation of any device, the basic operative mode of which is repetitive and is or can be accurately transduced into a variable frequency electrical signal.

Still another object of this invention is to provide a mechanism speed monitoring system comprising a tachometer generator which generates a signal the frequency of which varies as a function of the sensed speed, and a frequency responsive device which produces a D.C. voltage signal, the polarity and amplitude of which is representative of the sensed frequency.

Yet another object of this invention is to provide a frequency responsive device including two resonant reeds tuned to different frequencies and having over-lapping frequency ranges to which they are vibrationally responsive combined with apparatus for transducing the vibrations of each of the reeds into separate D.C. output voltage signals in accordance with an input signal frequency.

Still another object of this invention is to provide a frequency responsive device wherein a bi-morphic crystal assembly is provided for vibrating a tuned reed, and a bi-morphic crystal assembly is provided for transducing the vibrations of the reed into an electrical output signal.

It is a further object of this invention to provide a bi-morphic crystal assembly formed integrally with a tuned reed for causing vibration of the reed and a bi-morphic crystal assembly formed integrally with the reed for producing an output voltage signal in response to vibrations of the reed.

A further object of this invention is to provide a driving and sensing bi-morphic crystal assembly mechanically connected for flexural movement with a tuned reed.

A still further object of this invention is to provide a mechanically resonant reed having its free end folded accordion-fashion.

Other objects and advantages will become apparent from the following description taken in connection with the accompanying drawings in which.

Generally stated, this invention relates to a frequency responsive device for converting a variable frequency electrical signal into a D.C. output signal, the polarity and amplitude of which varies as a function of the variable frequency electrical signal. The frequency responsive device includes a frequency discriminator employing mechanically resonant vibrating reeds which are driven by either coils or bi-morphic crystals and employs either coils or bi-morphic crystals to sense the vibrations of the reeds which in response thereto produce separate electrical signals which are combined in a differential network to provide a single polarity changing D.C. voltage representative of the input frequency signal. Other important features of the invention are to be found in the unique construction of the frequency discriminators designed for use in the frequency responsive device with a view toward compactness, reliability, ease of manufacture, and ease of adjustment.

Figure 1:
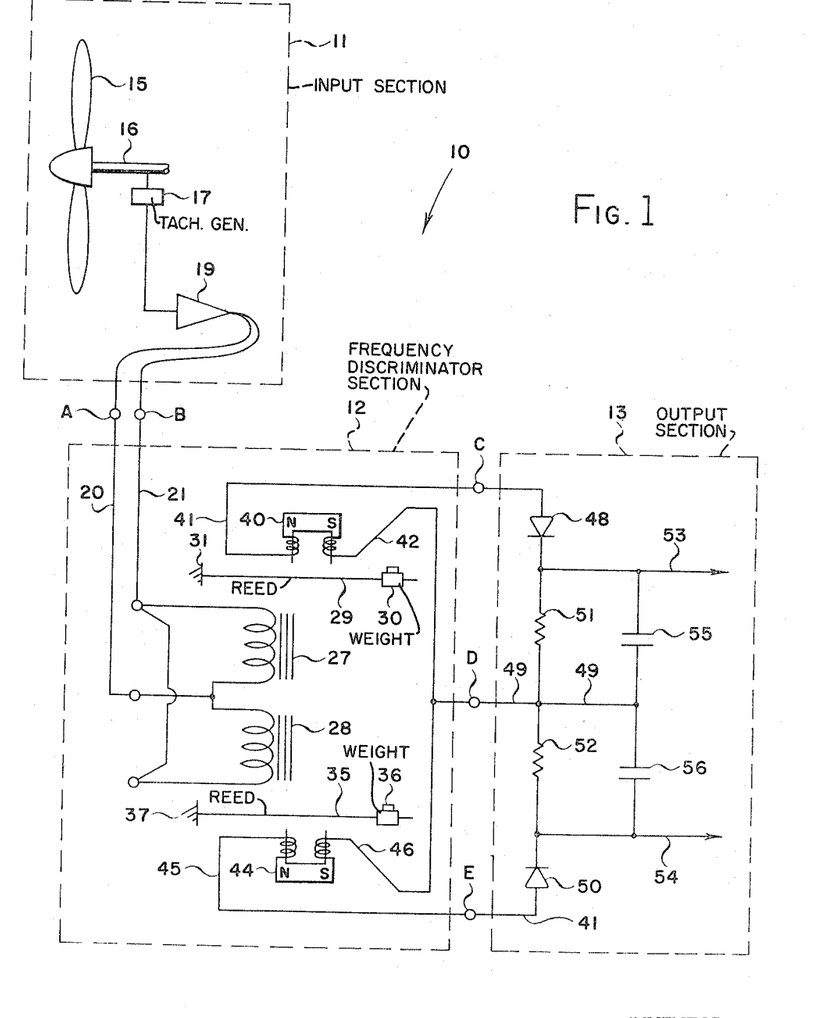
FIGURE 1 is a schematic drawing of one embodiment of the frequency responsive device of this invention.

Referring now to FIGURE 1, therein shown is a frequency responsive device 10 of this invention generally comprising an input section 11 connected by connection points A and B to the frequency discriminator section 12 which is connected to the output section 13 by connection points C, D and E.

In the input section 11 there is provided a constant speed propeller 15 mounted on a shaft 16 which is driven by a speed governed prime mover, not shown. A tachometer frequency generator 17 is connected to the shaft 16 and is operative to generate an A.C. electrical signal, the frequency of which varies as a direct function of the speed of shaft 16. The A.C. signal frequency thus produced is fed to the frequency amplifier-limiter 19 and from there is fed through leads 20 and 21 to the center connected coils 27 and 28.

A thin and elongate mechanically resonant magnetic reed 29 having a weight 30 adjustably mounted on its free end is cantilever mounted from support 31 operatively adjacent the coil 27, and a thin and elongate mechanically resonant magnetic reed 35 having a weight 36 adjustably mounted on its free end is cantilever mounted from support 37 operatively adjacent the coil 28. Reeds 29 and 35 which may properly be called reed assemblies are disposed operatively adjacent coils 27 and 28 such that the reeds will be caused to vibrate by the changing flux lines produced in the coils by the incoming A.C. signal frequency. For sensing the vibrations of the reeds, there are provided coils 40 and 44 operatively adjacent reeds 29 and 35, respectively. Coil 40 is a permanent magnet having a lead 41 counterclockwise wound on one pole and a lead 42 clockwise wound on the other pole. The coil 44 also is a permanent magnet and has a lead 45 counterclockwise wound on one pole and a lead 46 clockwise wound on the other pole. The leads 41, 42 and 45, 46 are oppositely wound to prevent voltages from coils 27 and 28 being induced in coils 40 and 44, respectively. These voltages are present at all times and would constitute an objectionable signal since it is desired that voltages be present in coils 40 and 44 only when the reeds 29 and 35 are in vibration. To eliminate the effects of such induced voltages, the coils 40 and 44 should be physically centered with respect to the center line of coils 27 and 28 so that any voltages induced into the two poles of each coil 40 and 44 are equal and opposite and therefore cancel.

For connecting frequency discriminator 12 to output circuit 13 by connection points C, D and E, lead 41 is connected to diode 48 of the output circuit, lead 42 is connected to center lead 49 of the output circuit, lead 45 is connected to diode 50 of the output circuit, and lead 46 is connected to the center lead 49. In the output circuit 13, the diodes 48 and 50 are connected through resistors 51 and 52 to center lead 49 and to output leads 53 and 54. To complete the output circuit 13, output leads 53 and 54 are connected by preferably two capacitors 55 and 56 to center lead 49.

In operation, the frequency generator 17 produces an A.C. signal frequency of predetermined frequency when the propeller is operating at a desired speed setting, such as 100 percent of its design speed. The frequency discriminator operates in response to this input signal frequency and in so doing uses the input signal frequency as a base or reference frequency for controlling the polarity and amplitude of the D.C. output voltage signal formed in the output section 13. Since the input signal frequency is used as a base frequency, it is necessary that the reeds 29 and 35 of the frequency discriminator be selected to be vibrationally responsive to overlapping frequency ranges and are tuned to be mechanically resonant to frequencies which are equally disposed on each side of the input base signal frequency.

In accordance with procedures known in the art, the reeds 29 and 35 may be designed to be sensitive to vibrations over various bands of frequencies ranging from a small fraction of one cycle per second up to several cycles per second. Although the sensitivity of the reeds 29 and 35 influences the sensitivity of the frequency discriminator 12, the particular sensitivity of the reeds does not adversely affect the operation of the frequency discriminator so long as the sensitivities of the reeds are matched. Further, when reeds 29 and 35 of a selected sensitivity are employed in a frequency discriminator, the placement of the center frequency of the reeds with respect to the input signal frequency determines the band pass of response of the frequency discriminator. That is, if for example, reeds 29 and 35 were each selected to be sensitive over a frequency range of three cycles and were mechanically resonant to 69 cycles and 71 cycles, respectively; then the frequency ranges to which the reeds 29 and 35 are vibrationally responsive, are overlapping and the band pass of response of the frequency responsive device would be from 69 to 71 cycles. If, on the other hand, the reeds 29 and 35 were each sensitive over a frequency range of one cycle per second and were tuned to be mechanically resonant to 69.7 cycles and 70.3 cycles, respectively, then the frequency ranges to which the reeds are vibrationally responsive are overlapping and the band pass of response of the frequency discriminator 12 would be from 69.7 to 70.3 cycles. It will be appreciated from the above that the band pass of response of the frequency discriminator and its frequency discriminating characteristics can be accurately selected by selecting reeds 29 and 35 of a desired quality and by the discriminate placement of their center frequencies with respect to one another and the base frequency.

By way of a more specific example of the operation of the frequency responsive device 10, let us assume that the frequency generator 17 produces a signal frequency of 70 cycles at the desired speed of the propeller 15 and that the reeds 29 and 35 are mechanically resonant to 71 cycles and 69 cycles, respectively, and have overlapping frequency ranges to which they are vibrationally responsive. Under conditions when frequency generator 17 is producing a signal frequency of 70 cycles, the coils 27 and 28 are energized a corresponding amount and cause or induce vibration in the reeds 29 and 35 by alternately attracting and repelling them. Since the reeds 29 and 35 are tuned to frequencies which are one cycle above and one cycle below the 70-cycle drive frequency, they vibrate through identical arcs and therefore present the same amount of magnetic material into the flux field of the coils 40 and 44 to thereby induce separate but identical A.C. signal voltages in the coils 40 and 44. These separate A.C. signal voltages are fed through leads 41, 42 and leads 45, 46 to diodes 48 and 50, respectively, where they are rectified into separate D.C. voltage signal pulses of 10 volts D.C. each, for example, and are summed in resistors 51 and 52 and capacitors 55 and 56 and are fed to output through leads 53 and 54. Since the D.C. signal voltages induced in coils 40 and 44 are equal in magnitude and opposite in polarity in the resistors 51 and 52 when the signal frequency is 70 cycles, their summation is zero and no output signal is produced under such condition.

If then the signal frequency increases from 70 cycles to 70.5 cycles, for example, by reason of an increase in the speed of propeller 15 from its desired speed, the frequency at which reed 29 is driven is closer to its mechanical resonant frequency of 71 cycles and the frequency at which reed 35 is driven is a corresponding amount further away from its mechanical resonant frequency of 69 cycles. Therefore, reed 29 will be driven through a greater arc than reed 35 and reed 29 will excite coil 40 such that a voltage of plus 15 volts D.C. will be applied to resistor 51, for example, and reed 35 will excite coil 44 such that a voltage of minus 5 volts D.C. will be applied to resistor 52, for example. These separate D.C. voltages are summed and combined in resistors 51 and 52 into plus 10 volts D.C. and a single D.C. output voltage signal of this polarity and amplitude is fed to output through leads 53 and 54.

If on the other hand the signal frequency decreases from 70 cycles to 69.5 cycles, for example, by reason of a decrease in the speed of propeller 15 from its design speed, the frequency at which reed 35 is driven is closer to its mechanical resonant frequency of 69 cycles and the frequency at which reed 22 is driven is a corresponding amount further away from its mechanical resonant frequency of 71 cycles. Therefore, reed 35 will be driven through a greater arc than reed 29 and reed 35 will excite coil 44 such that a voltage of minus 15 volts D.C. will be applied to resistor 51 while reed 29 will excite coil 40 such that a voltage of plus 5 volts, for example, will be applied to resistor 51. These separate D.C. voltages are summed and combined in resistors 52 and 51 into minus 10 volts D.C. and a single D.C. output voltage signal of this polarity and amplitude is fed to output through leads 53 and 54. It will be seen from the above that if the input signal frequency to the frequency discriminator varies from 70 cycles that the polarity and amplitude of the D.C. voltage output from the system will vary in an amount corresponding thereto to accurately reflect the speed of propeller 15.

Figure 2:
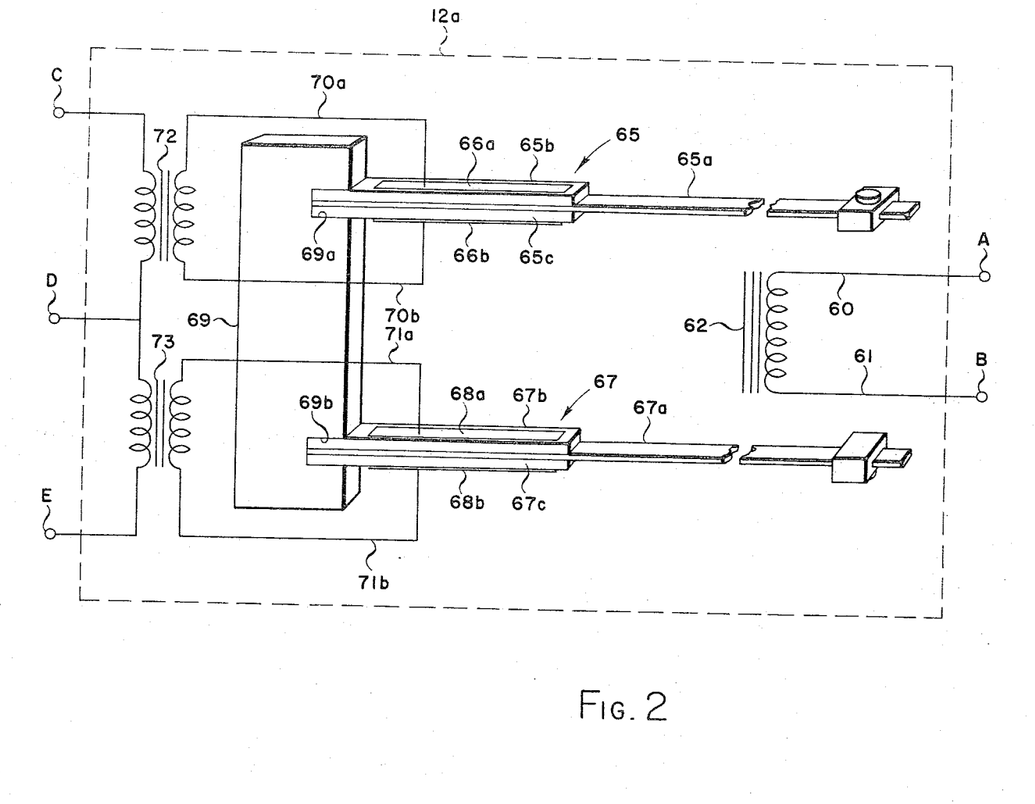
FIGURE 2 shows one embodiment of a frequency discriminator for use in the frequency responsive device of FIGURE 1.

Referring now to FIGURE 2 therein shown is the frequency discriminator 12a, another form of the frequency discriminator 12 of FIGURE 1, which is interchangeable with the frequency discriminator 12 within the frequency responsive device 10 of FIGURE 1 by attachment of connection points A, B, C and D to the corresponding connection points of input section 11 and output section 13.

More particularly, the frequency discriminator 12a comprises input leads 60 and 61 through which a signal frequency is supplied from the input section 11 to the coil 62. Reed assembly 65 comprises adjustably weighted metallic reed 65a having separate oppositely polarized piezo-electric crystals 65b and 65c bonded thereto along one end by an electrically conductive bonding cement. The crystals 65b and 65c extend along approximately one-third the length of the reed 65a and have electrodes 66a and 66b bonded to substantially the entire length of their exposed surfaces. Piezo-electric crystals 65b and 65c and electrodes 66a and 66b form a driven bi-morphic crystal assembly integral with the reed 65a, as will more clearly appear.

In a like manner, reed assembly 67 comprises weighted metallic reed 67a having separate oppositely polarized piezo-electric crystals 67b and 67c bonded thereto and electrodes 68a and 68b which are bonded to substantially the entire exposed face of crystals 67b and 67c, respectively. Further, the crystals 67b and 67c and the electrodes 68a and 68b form a bi-morphic crystal assembly integral with the reed 67a. The reed assemblies 65 and 67 thus formed are fixedly cantilever mounted in cutouts or slots 69a and 69b of mounting block 69 such that the electrodes 66a, 66b and 68a, 68b are out of contact with the mounting block 69. For effecting vibration of the reed assemblies 65 and 67, the coil 62 is disposed operatively adjacent the free ends of reeds 65a and 67a; and for connecting the reed assemblies 65 and 66 to output, the electrodes 66a and 66b are connected by leads 70a and 70b to the primary of stepdown transformer 72. In a like manner, the electrodes 68a and 68b are connected to the primary of stepdown transformer 73 by leads 71a and 71b. The secondaries of transformers 72 and 73 are in turn connected to the output circuit 13 of FIGURE 1 by connecting their output leads at connection points C, D and E to the corresponding points of the output circuit 13.

The basic mode of operation of the frequency responsive device 10 when using the frequency discriminator 12a is identical to that when it is using the frequency discriminator 12 of FIGURE 1 and the operation of the frequency discriminators is identical insofar as they employ reed assemblies which are vibrationally responsive to overlapping frequency ranges which are tuned to be mechanically resonant to frequencies equally disposed on each side of the base frequency received from the input section 11 to produce a polarity changing variable amplitude D.C. voltage signal in the output section 13. However, the specific manner in which the reed assemblies of the frequency discriminator 12a transduce the base signal frequency into separate output voltages differs from the manner in which the reed assemblies of the frequency discriminator 12 accomplish the same result, and their operation will therefore be described in detail at this time.

In the operation of the frequency responsive device of this invention with the frequency discriminator 12a of FIGURE 2, the input section 11 may supply an A.C. signal frequency to the coil 62 to cause its energization. As the reed assembly 65 is vibrated, for example, the piezo-electric crystals 65b and 65c, which form a part of the bi-morphic crystal assembly, are alternately flexed in tension and in compression; and as a consequence, a charge is induced across the thickness of each of the crystals 65b and 65c. As the crystals 65b and 65c are constructed to be of opposite polarities and are mechanically and electrically connected to the metallic reed 65a (the reed 65a may be called a common electrode), and as the crystals 65b and 65c are electrically connected in series, the charges produced thereby are three to four times the magnitude of either of the separate charges formed by the crystals 65b and 65c. These charges are fed to output through the electrodes 66a and 66b and are summed or combined in the transformer 72. Thus, it will be seen that the driven bi-morphic crystal assembly formed by the mechanical and electrical connection of two piezo-electric crystals 65b and 65c of opposite polarity to the reed 65a, which crystals are series connected to output, provides a much stronger output signal than a single-driven piezo-electrical crystal upon which a reed was mounted could produce. In a like manner, the coil 62 causes the reed assembly 67 to vibrate and the crystals 65b and 65c produce charges which are summed or combined in the transformer 73. The electrical signals thus formed by the reed assemblies 65 and 67 are fed into the output section 13 where they are summed and combined in a manner described in detail with respect to the frequency responsive device of FIGURE 1.

Figure 3:
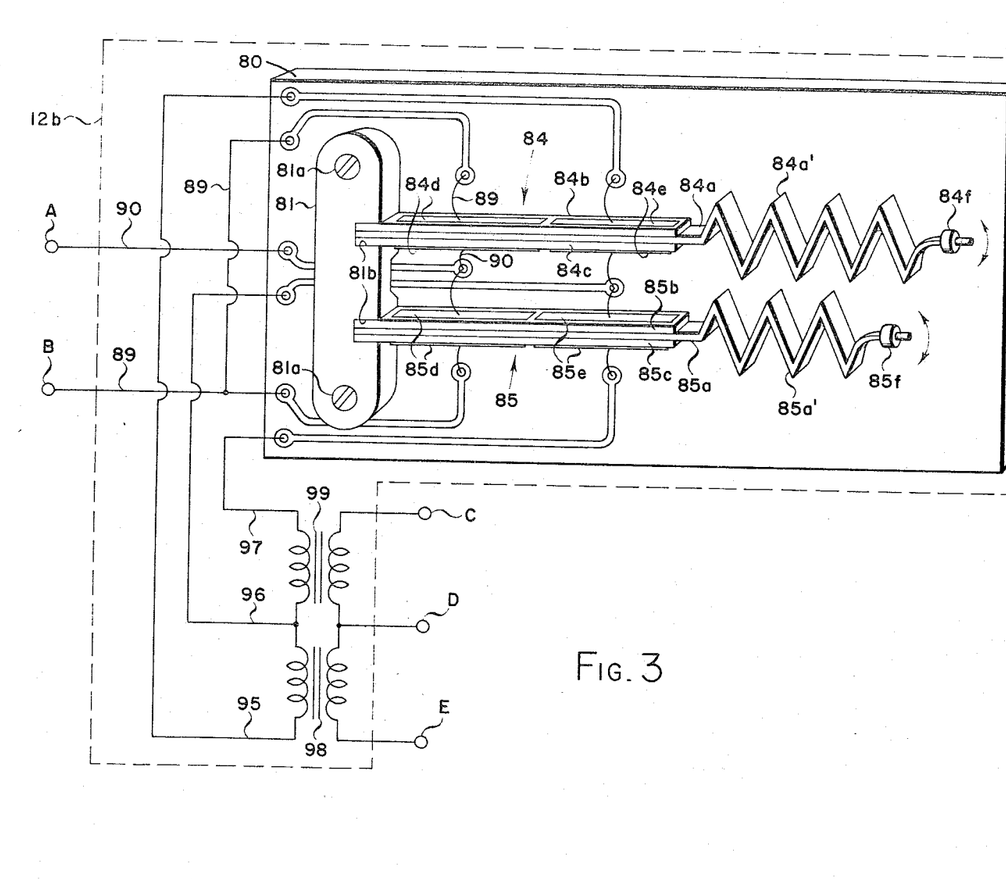
FIGURE 3 shows a further frequency discriminator embodiment for use in the frequency responsive device of FIGURE 1.

Referring now to FIGURE 3, therein shown is the frequency discriminator 12b, another form of the frequency discriminator 12 of FIGURE 1, which is interchangeable with the frequency discriminator 12 within the frequency responsive device 10 by attachment of connection points A, B, C and D to the corresponding connection points of input section 11 and output section 13.

More specifically, the frequency discriminator 12b comprises a mounting board 80 to which the mounting block 81 is secured by screws 81a. Mounting block 81 is provided with cutouts or slots 81b for cantilever mounting the mechanically resonant reed assemblies 84 and 85. The reed assemblies 85 and 85 are identical in construction; therefore, for ease of description, the assembly 84 will be described in detail and the corresponding components of assembly 85 will be given reference numeral suffixes corresponding thereto. The reed assembly 84 comprises a thin elongate metallic reed 84a having separate oppositely polarized piezo-electric crystals 84b and 84c bonded thereto along one end by an electrical conductive bonding cement. Electrodes 84d are bonded to crystals 84b and 84c opposite one another, and electrodes 84e are bonded to crystals 84b and 84c opposite one another in spaced apart relation from the electrodes 84d. The piezo-electric crystals 84b and 84c, and reed 84a in the area covered by electrodes 84d, form a driving bi-morphic crystal assembly; and the piezo-electric crystals 84b and 84c, and reed 84a in the area covered by electrodes 84e, form a driven bi-morphic crystal assembly.

The free end 84a' of reed 84a longitudinally extends from the free end of crystals 84b and 84c, is provided with the adjustable weight 84f, and is preferably folded accordion-fashion in its plane of flexure to reduce the length of the reed assembly. Also, by folding the end 84a' of the reed 84a, the reed may be rough tuned to a selected frequency within a range of frequencies as much as thirty percent or possibly more below the frequency to which the reed is naturally resonant by selectively forming the folds of the reed at different angles with respect to each other. This rough tuning capability is made possible because in folding the reeds the effective length of the reeds as related to its vibrational characteristics is changed as well as its longitudinal length. It will be appreciated from the above that the folding of the reeds in addition to saving space permits the stocking of a single size reed which may be rough tuned within reasonable limits to a desired frequency merely by changing the angle of the folds and that the reed thus rough tuned may be fine-tuned by the selective adjustment of the weight along its free end. In this manner freedom of design is obtained without a prohibitive cost penalty. For connecting the reed assembly 84 to input, the electrodes 84d are connected by leads 89 and 90 each including a printed circuit portion formed on mounting base 80 to connecting points A and B, respectively. Also, for connecting reed assembly 84 to output, the electrodes 84e are connected by leads 95, 96 and 97 each including a printed circuit portion formed on mounting board 80 to the primaries of transformers 98 and 99, the secondaries of which are connected to the output section 13 at connection points C, D and E. In a like manner, the electrodes 85d of the reed assembly 85 are connected by leads 89 and 90 to connecting points A and B, and the electrodes 85e are connected by leads 95, 96 and 97 to output transformers 98 and 99.

The basic mode of operation of the frequency responsive device 10 when using the frequency discrminator 12b is identical to that when it is using the frequency discriminator 12 of FIGURE 1 and the operation of the frequency discriminators is identical insofar as they both employ reed assemblies which are vibrationally responsive to over-lapping frequency ranges which are tuned to be mechanically resonant to frequencies equally disposed on each side of the base frequency received from the input section 11 to produce a polarity changing variable amplitude D.C. voltage signal. However, the specific manner in which the reed assemblies of the frequency discriminator 12b transduce the base signal frequency into separate output voltages varies from the manner in which the reed assemblies of the frequency discriminator 12 perform the same function and their operation will therefore be described in detail at this time.

In the operation of the frequency responsive device 10 of this invention with the frequency discriminator 12b of FIGURE 3, the input section 11 may supply an A.C. signal frequency to the electrodes 84e and 85e through leads 89 and 90. In response to the signal frequency, charges are formed across the thicknesses of the crystals 84b and 84c between the electrodes 84e and the center electrode or reed 84a, and charges are also formed across the thicknesses of the crystals 85b and 85c between the electrodes 85e and the center electrode or reed 85a. Since the crystal 84b has an opposite polarity from that of the crystal 84c and the crystal 85b has an opposite polarity from that of the crystal 85c, the crystals 84b and 85b are caused to expand in tension when the crystals 84c and 85c are caused to contract in compression and vice versa. As a result, the reed assemblies 84 and 85 are flexed in one direction during one half cycle of the input signal frequency and in the other direction during the other half cycle of the incoming signal frequency. The sum driving force applied to the reed assemblies 84 and 85 by the driving bi-morphic crystal assemblies just described is three to four times the driving force produced by the piezo-electric crystals if acting separately. As the reed assemblies 84 and 85 vibrate in response to the incoming signal frequency, a charge is formed across each of crystals 84b and 84c, 85b an 85c, which charges are collected on electrodes 84d and 85d, respectively, and are summed in the secondaries of transformers 86 and 87 in the same manner as described in connection with the driven bi-morphic crystal assembly disclosed in FIGURE 2. In turn, these signals are fed to the output circuit 13 where they are summed and combined in the manner mentioned in the description of FIGURE 1 into a single polarity changing variable amplitude D.C. voltage signal.

From a superficial analysis of the construction of reed assemblies 84 and 85, it might appear that the input voltage applied to electrodes 84d and 85d of the driving bi-morphic crystal assemblies might leak over to electrodes 84e and 85e, respectively, of the driven bi-morphic crystal assemblies where they would be collected along with the charges generated by flexure of the driven bi-morphic crystal assemblies. To eliminate possible adverse effects of any such leakage, the electrodes 84d and 84e and the electrodes 85d and 85e are spaced apart with an end-to-end relationship in such a manner that inter electrode capacitance of the bi-morphic crystal assemblies is practically non-existent. Electrical isolation of the driving electrodes 84d and 85d from the driven electrodes 84e and 85e by mounting them in spaced apart, end-to-end relation is achieved because the crystals 84b, 84c, 85b and 85c have high dielectric properties.

Figure 4:
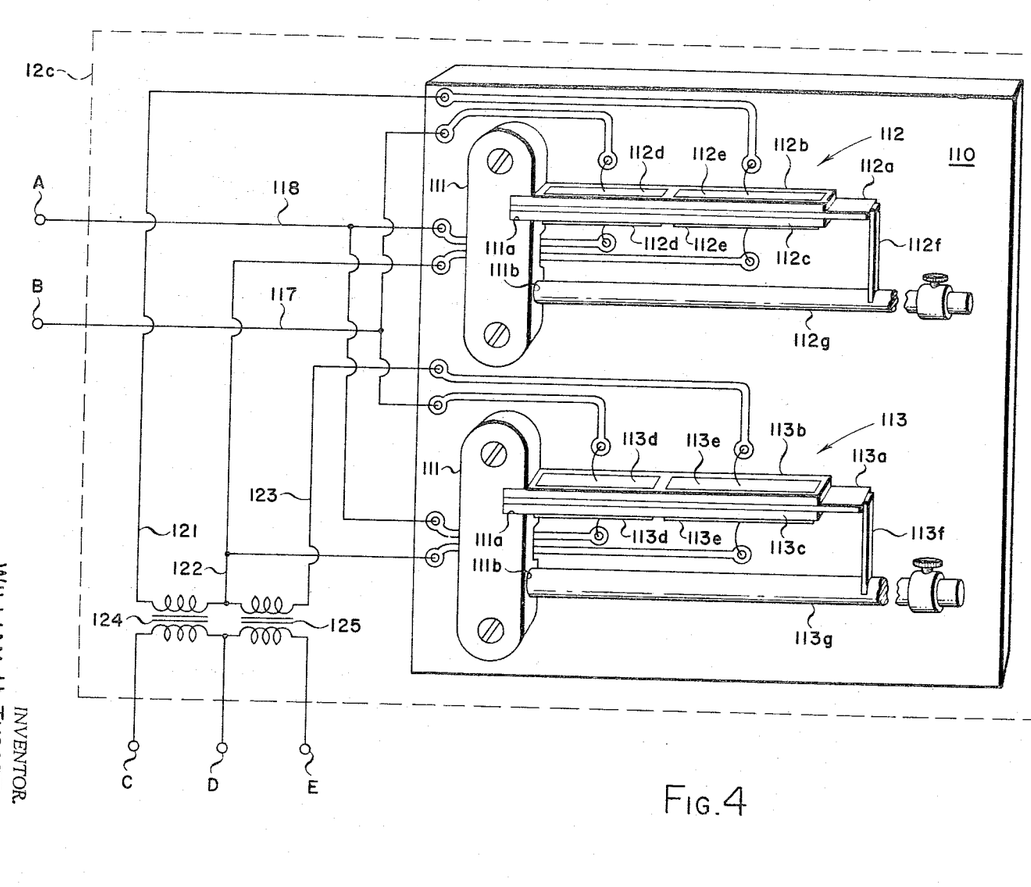
FIGURE 4 depicts still another frequency discriminator for use in the frequency responsive device of FIGURE 1.

Referring now to FIGURE 4, therein shown is the frequency discriminator 12c, another form of the frequency discriminator 12 of FIGURE 1, which is interchangeable with the frequency discriminator 12 within the frequency responsive device 10 by attachment of connection points A, B, C and D to the corresponding connection points of input section 11 and output section 13. More specifically, the frequency discriminator 12c comprises a mounting board 110 to which the mounting blocks 111 are secured by screws. Mounting blocks 111 are each provided with cutouts or slots 111a and 111b for mounting the mechanically resonant reed assemblies 112 and 113. Since the reed assemblies are identical in construction, the reed assembly 112 will be described in detail and the corresponding components of reed assembly 113 will be given reference numeral suffixes corresponding thereto.

The reed assembly 112 comprises a thin electrically conductive metallic reed 112a having separate oppositely polarized piezo-electric crystals 112b and 112c mounted on its opposite sides. Electrodes 112d are bonded to crystals 112b and 112c opposite one another and electrodes 112e are bonded to crystals 112b and 112c opposite one another in spaced apart, end-to-end relation from the electrodes 112d to form driving and driven bi-morphic crystal assemblies, respectively. The free end of reed 112a is connected by rigid connector plate 112f to the mechanically resonant reed 112g which is cantilever mounted in slot 111b of mounting block 111. Reed 112g is preferably round to decrease its resistance to movement in an atmosphere.

The composite reed formed by reed 112a, crystals 112b and 112c, and electrodes 112d and 112e is designed such that its resistance to flexure is compatible with the flexural resistance of reed 112g, which is cantilever mounted in aligned spaced apart relation from reed 112a so that vibration of one reed 112a will be imparted in like kind to the other reed 112g through the connector 112f. The ends of the composite reed and the reed 112g move through different length arcs because of their different lengths and stiffness, and consequently they must be interconnected by connector 112f at a point along their lengths where they move through substantially identical length arcs. Experience shows that this criterion is met if the composite reed is secured at about one-thrd the distance from the fixed end of the reed 112g. Electrodes 112d are connected by leads 117 and 118 to connecting points A and B, respectively, and the electrodes 112e are conected by leads 121 and 122 to the primaries of output transformers 124 and 125, the secondaries of which are connected to the output section 13 at connection points C, D and E. In a like manner the electrodes 113d are connected by leads 117 and 118 to connecting points A and B, respectively, and the electrodes 113e are connected by leads 122 and 123 to the primaries of output transformers 124 and 125.

The basic mode of operation of the frequency discriminator device 12c is identical to that of the frequency discriminator 12b, and in operation of the frequency responsive device 10 of this invention with the frequency discriminator 12c of FIGURE 4, the input section 11 may supply an A.C. signal frequency to the electrodes 112d and 113d through leads 117 and 118. In response to the signal frequency, charges are formed across the thicknesses of crystals 112b and 112c between the electrodes 112d and the center electrode or reed 112a substantially immediately beneath the electrode 112d. In a like manner, charges are formed across the thickness of crystals 113b and 113c between electrodes 113d and the center electrode or reed 113a substantially immediately beneath the electrodes 113d. The crystals 112b and 112c, electrodes 112d and reed 112a together with the crystals 113b and 113c, electrodes 113d and reed 113a form driving bi-morphic crystal assemblies which are operative to vibrate reeds 112g and 113g, respectively, through rigid connectors 112f and 113f in the same manner as the corresponding driving bi-morphic crystal assemblies of FIGURE 3 are operative to vibrate the reeds 84a and 85a. In a like manner, the crystals 112b and 112c, electrodes 112e and reed 112a together with the crystals 113b and 113c, electrodes 113e and reed 113a form driven bi-morphic crystal assemblies which are operative in response to vibration of reeds 112g and 113g to generate output voltage signals which are applied to the primaries of transformers 124 and 125, respectively, in the same manner as the corresponding driven bi-morphic crystal assemblies of FIGURE 3 are operative to generate voltage signals.

Figure 5:
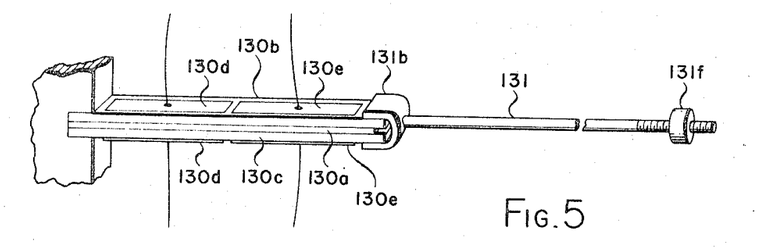
FIGURE 5 shows an embodiment of a resonant reed assembly.

An alternate embodiment of the bi-morphic crystal type reed assemblies of FIGURES 3 and 4 is shown in FIGURE 5. The reed assembly 130 disclosed therein comprises the thin metallic reed 130a having oppositely polarized piezo-electric crystals 130b and 130c bonded to the opposite sides thereof. Electrodes 130d are bonded to crystals 130b and 130c opposite one another and electrodes 130e are bonded to crystals 130b and 130c opposite one another in spaced apart, end-to-end relation from electrodes 130d to form driving and driven bi-morphic crystal assemblies, respectively. Mounted as by crimping or bonding on the free terminal end of the composite reed thus formed is a cylindrical reed element 131 having a cup-shaped connector 131b on its one end and an adjustable weight 131f on its other end. The reed element 131 may be made of suitable material to give it a desired stiffness and is preferably in the order of twice the length of the composite reed to which it is secured. One principal advantage of this construction is that reed elements 131 of different length and stiffness may be connected to standard composite reeds. Also, the reed element 131 being cylindrical has a low resistance to movement in an atmosphere as compared with a flat reed, thus giving it better operating characteristics than a flat reed.

Figure 6:
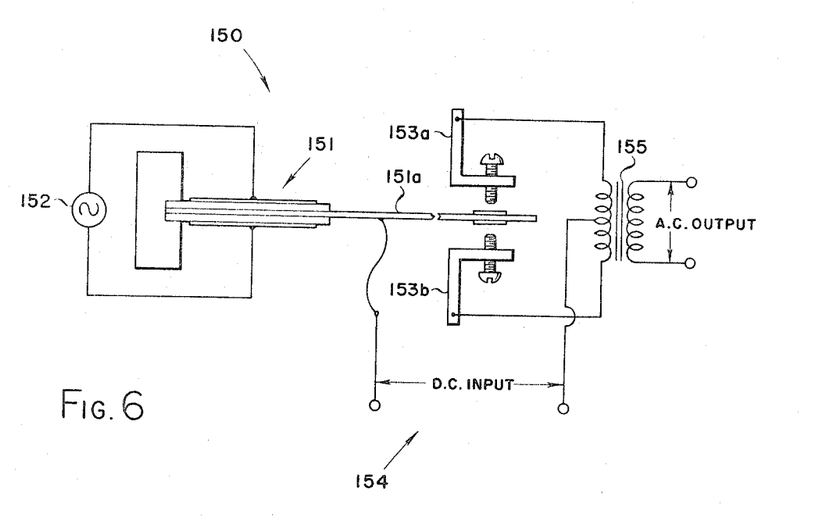
FIGURE 6 shows a D.C. to A.C. converter constructed in accordance with this invention.

Although the reed assemblies disclosed herein have been described in connection with the frequency discriminator used in applicant's new and novel frequency responsive device 10, it is to be understood that they may find utility in other and different electrical devices such as filters as disclosed in the U.S. Patent 2,875,353 to Cavaliere et al., patented Feb. 24, 1959, or in a converter for the conversion of a D.C. voltage signal to an A.C. voltage signal as shown in FIGURE 6. Briefly, the converter apparatus 150 of FIGURE 6 comprises a bi-morphic crystal driven reed assembly 151 caused to vibrate at resonant frequency by the A.C. exciting voltage 152. During vibration, the metallic reed 151a of the reed assembly 151 alternately makes electrical circuit connection with the electrical contacts 153a and 153b to cause the D.C. voltage source 154 to be alternately applied to the halves of the primary of center tap transformer 155, which in turn applies a voltage signal of opposite polarities to the secondary thereof during alternate swings of the reed 151a to form an A.C. voltage signal in the secondary of the transformer.

In summary, the frequency responsive device is operative to monitor or control a device the basic operative mode of which is or may be converted into a variable signal frequency. This result is accomplished by employing uniquely constructed reed assemblies which are selected to have over-lapping frequency ranges and which are tuned to frequencies equally disposed on each side of a base input signal frequency. The reed assemblies thus selected and tuned are operative in response to a change in the base frequency to initiate separate A.C. voltage signals the amplitudes of which vary in accordance with the input signal frequency. These A.C. voltage signals are then converted into D.C. voltage signals and combined in a differential network into a variable amplitude polarity changing D.C. voltage signal indicative of the input signal frequency.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

What is claimed is:

1. A frequency responsive device comprising: means for initiating a signal frequency which varies from a base frequency as a function of the basic operative mode of a device; a frequency discriminator including cantilever mounted reed assemblies each mechanically resonant to frequencies equally disposed on each side of said base frequency and having over-lapping frequency ranges to which they are vibrationally responsive; means for vibrating each of said reed assemblies in response to said signal frequency; transducer means for transducing the vibrations of said reed assemblies into separate variable amplitude A.C. voltage signals; means for converting said A.C. voltage signals into D.C. voltage signals; means for summing and combining said D.C. voltage signals into a single D.C. signal whose voltage amplitude and polarity are representative of the changes of said signal frequency from said base frequency, said reed assemblies including a reed folded accordion-fashion at its free end.

2. A frequency responsive device comprising: a tachometer frequency generator for sensing the speed of a rotating shaft and initiating a variable frequency signal which varies from a base frequency as a function of the change in speed of the shaft from a predetermined speed; a frequency discriminator including two cantilever mounted reed assemblies each mechanically resonant to frequencies equally disposed on each side of said base frequency and having over-lapping frequency ranges to which they are vibrationally responsive; means for vibrating each of said reed assemblies in response to said signal frequency; transducer means for transducing the vibrations of said reed assemblies into separate variable amplitude D.C. voltage signals; and means for summing and combining said D.C. voltage signals into a single D.C. signal whose voltage amplitude and polarity are representative of the change of said signal frequency from said base frequency.

3. A frequency responsive device comprising: a tachometer frequency generator for sensing the speed of a rotating shaft and initiating a variable frequency signal which varies from a base frequency as a function of the change in speed of the shaft from a predetermined speed; a frequency discriminator including two cantilever mounted reed assemblies each mechanically resonant to frequencies equally disposed on each side of said base frequency and having over-lapping frequency ranges to which they are vibrationally responsive; means for vibrating each of said reed assemblies in response to said signal frequency; transducer means for transducing the vibrations of said reed assemblies into separate variable amplitude D.C. voltage signals; and a differential network for summing and combining said D.C. voltage signal into a single D.C. signal whose voltage amplitude and polarity are representative of the change of said signal frequency from said base frequency.

4. A frequency discriminator responsive to an input frequency change relative to a base signal frequency comprising first and second cantilever mounted reed assemblies mechanically resonant to frequencies equally disposed on each side of said base frequency and having over-lapping frequency ranges to which they are vibrationally responsive; means for vibrating said reed assemblies in accordance with said input signal frequency; transducer means for transducing the vibrations of said reed assemblies into separate variable amplitude A.C. voltage signals; converter means for converting said A.C. voltage signals into D.C. voltage signals; and means for summing and combining said D.C. voltage signals into a single D.C. signal whose voltage amplitude and polarity are representative of the change of said input signal frequency with respect to said base frequency, wherein each of said reed assemblies includes an electrically conductive reed, piezo-electric crystals of opposite polarities bonded to the opposite sides of said reed adjacent the cantilever mounted end thereof; a first pair of electrodes bonded to the surface of said piezo-electric crystals opposite one another along a portion of the length thereof; and a second pair of electrodes bonded to the surface of said piezo-electric crystals opposite one another along the other portion of the length thereof in spaced apart, end-to-end relation with respect to said first pair of electrodes, said first pair of electrodes, said piezo-electric crystals therebeneath and said electrically conductive reed therebetween forming a driving bi-morphic crystal assembly for vibrating said reed assembly in response to said input signal frequency and said second pair of electrodes, said piezo-electric crystals therebeneath and said electrically conductive reed therebetween forming a driven bi-morphic crystal assembly for transducing the vibrations of said reed assemblies into separate electrical signals.

5. The frequency discriminator of claim 4 wherein each of said electrically conductive reeds are folded accordion-fashion at their free ends.

6. The frequency discriminator of claim 4 wherein each of said electrically conductive reeds is connected at its free end by a rigid connector to a second cantilever mounted reed.

7. A mechanically resonant reed assembly comprising: a cantilever mounted electrically conductive reed; oppositely polarized piezo-electric crystals secured to opposite sides of said reed; a first pair of electrodes secured in opposed relation to said piezo-electric crystals to form a driving bi-morphic crystal assembly with said reed and a second pair of electrodes secured in opposed relation to said piezo-electric crystals in spaced apart, end-to-end relation with respect to said first pair of electrodes to form a driven bi-morphic crystal assembly with said reed.

8. The mechanically resonant reed assembly of claim 7 wherein the free end of said reed is folded accordion-fashion.

9. The mechanically resonant reed assembly of claim 7 wherein the free end of said reed is connected by a rigid connector to a second reed cantilever mounted in parallel relation thereto.

10. A frequency responsive device comprising:

means for initiating a signal frequency which varies from a base frequency as a function of the basic operative mode of a device;

a frequency discriminator including cantilever mounted reed assemblies each mechanically resonant to frequencies equally disposed on each side of said base frequency and having over-lapping frequency ranges to which they are vibrationally responsive;

means for vibrating each of said reed assemblies in response to said signal frequency;

said means for vibrating said reed assemblies comprising a driving bi-morphic crystal assembly connected to each of said reed assemblies;

transducer means for transducing the vibrations of said reed assemblies into separate variable amplitude A.C. voltage signals;

said transducer means comprising a driven bi-morphic crystal assembly connected to each of said reed assemblies;

means for converting said A.C. voltage signals into D.C. voltage signals; and means for summing and combining said D.C. voltage signals into a single D.C. signal whose voltage amplitude and polarity are representative of the changes of said signal frequency from said base frequency.

References Cited
UNITED STATES PATENTS

| | | | |
|---|---|---|---|
| 2,195,417 | 4/1940 | Mason | 317—144 |
| 2,505,164 | 3/1950 | Weathers et al. | 324—78 |
| 2,506,727 | 5/1950 | Mas | 200—91 |
| 2,594,091 | 4/1952 | Summerhayes | 324—80 |
| 2,630,482 | 3/1953 | Bostwick | 333—71 |
| 2,875,353 | 2/1959 | Cavalieri et al. | 333—72 |
| 3,076,940 | 2/1963 | Davis | 329—140 |
| 3,109,153 | 10/1963 | Rodek | 333—72 |

FOREIGN PATENTS

| | | |
|---|---|---|
| 106,812 | 3/1939 | Australia. |
| 417,250 | 11/1945 | Italy. |

RUDOLPH V. ROLINEC, *Primary Examiner.*

FREDERICK M. STRADER, *Examiner.*

C. W. HOFFMAN, M. J. LYNCH, *Assistant Examiners.*